Patented Dec. 20, 1938

2,141,090

UNITED STATES PATENT OFFICE 2,141,090

N-SUBSTITUTED PARA-AMINOBENZALDE-HYDES

Werner Müller, Cologne, and Carl Berres, Leverkusen-Wiesdorf, Germany, assignors to General Aniline Works, Inc., New York, N. Y., a corporation of Delaware No Drawing. Application April 2, 1936, Serial No. 72,448. In Germany April 12, 1935

7 Claims. (Cl. 260—577)

The present invention relates to a process for the manufacture of nitrogenous aromatic aldehydes and to the products obtained in accordance with that new process, more particularly it relates to aldehydes which may be represented by the general formula:

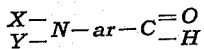

In the said formula X stands for halogenalkyl, hydroxyalkyl, in which the hydroxy group may be etherified by alkyl, or sulfoalkyl, Y stands for hydrogen, alkyl, halogenalkyl, hydroxyalkyl, which may be etherified by alkyl, sulfoalkyl, aryl or the benzyl radicle, which latter two radicals may bear substituents, such as alkyl, alkoxy and halogen, or X and Y stand for methylene chains which are joined together by an oxygen atom, and ar stands for an aromatic radical bearing an aldehyde group in para position to the nitrogen atom.

Our new aldehydes are obtainable by allowing to act upon halogen alkylaryl amines formyl compounds of secondary amines and halogenides of sulfur or phosphorus or their oxygen derivatives. In this process it is not necessary to start with the ready formed aromatic amines containing halogen alkyl groups, obtainable by the action of hydrohalic acids or inorganic acid halides upon aromatic compounds containing hydroxyalkyl groups attached to a nitrogen atom, but the corresponding hydroxyalkyl arylamines can be used as initial materials, in which case the halogenation and the manufacture of the aldehydes can be completed in a single operation by first employing the required quantity of the halogenating agent, as for instance phosphorus oxychloride. The components may if desired be allowed to act upon each other in the presence of an indifferent dissolving or diluting agent, as for instance benzene, halogen benzenes, chloroform, carbon tetrachloride, ethane tetrachloride and others.

The process proceeds in such a manner that in a first step one molecular proportion of the halogenide of sulfur or phosphorus or an oxygen derivative thereof, such as phosphorus oxychloride, reacts with one molecular proportion of the formyl compound of the amine, under formation of an addition compound. This addition compound attaches to the carbon atom in para position to the halogenalkyl amino group of the halogenalkyl arylamine, and by the action of water on the addition compound there is formed the aldehyde besides phosphoric acid (in case POCl₃ is used), hydrohalic acid and secondary amine.

The new reaction proceeds in a very smooth manner, and the new nitrogenous aromatic aldehydes are obtained in a very good yield and great purity. In general they form colorless crystalline substances, insoluble in water and soluble in organic solvents.

In the halogen alkylaryl aminoaldehydes thus obtained, the halogen atom can be easily substituted by other radicals, without affecting the sensitive aldehyde group. Thus it can be substituted, for instance, by hydroxyl, e. g. by treating with an aqueous alkali, by the sulfonic acid group by treating at elevated temperature and under pressure with an aqueous neutral solution of a sulfite, by the amino group or a substituted amino group by treating with ammonia or amines, by the alkoxy group by treating with alkylates and so on.

For the present process these are suitable as hydroxyalkyl arylamines all hydroxyethyl-, hydroxypropyl-, hydroxybutyl-, etc. arylamines, which may also be substituted, as for instance hydroxyethyl methyl-, hydroxyethyl-propyl-, hydroxyethyl-butyl-, hydroxyethyl-benzyl- and di-(hydroxyethyl)-aniline, hydroxyethyl-diphenylamine, hydroxypropyl methyl-, hydroxypropylbutyl- and hydroxybutylethyl-aniline.

As halides may be mentioned the phosphorus chlorides, phosphorus oxychloride, thionyl chloride, sulfuryl chloride and phosphorus oxybromide.

As formyl compound can be used, an N-phenyl tertiary formamide, for instance, N-methyl formanilide or N-formyl diphenylamine.

This result could not be foreseen, the less so as it is not possible, for instance, according to the processes of Vilsmeier and Haak (Berichte der Deutschen Chemischen Gesellschaft, vol. 60, p. 119) or those of British Patent No. 311,208 and the German Patents Nos. 519,444 and 519,806, to obtain from the hydroxyalkyl arylamines the corresponding hydroxyalkylamino arylaldehydes or at least the halogen alkylamino arylaldehydes, as besides small quantities of more or less halogenated products, some of which give the aldehyde reaction, large quantities of dark colored resinous substances are formed, which inhibit the purification and separation of uniform aldehydes. As compared therewith the present new and simple process presents a great technical advantage.

The aldehydes obtained are intended to be used for the synthesis of dyestuffs and other products.

The invention is illustrated by the following examples, without being restricted thereto:

*Example 1.*—At 40–50° C., 75.5 parts by weight of hydroxyethyl methylaniline are added, drop by drop, to 83 parts by weight of phosphorus oxychloride, and then the solution is heated at about 90° C. for some time. After cooling at 0° C. a mixture obtained in the known manner from 135 parts by weight of N-methyl formanilide, 154 parts by weight of phosphorus oxychloride, and 100 parts by weight of benzene is slowly added, drop by drop, to the above solution. The mixture is heated for a few hours at 30–35° C., and then the reaction mass is poured on ice. After neutralization with an aqueous solution of caustic soda, the benzene solution of the aldehyde is separated and distilled with steam. The p-N-chlorethyl N-methylamino benzaldehyde remains as a nearly colorless oil which soon hardens and which crystallizes from alcohol in massive prisms of melting point 70° C. The aldehyde corresponds to the following formula:

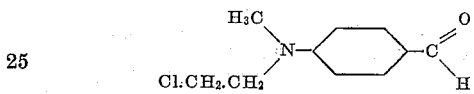

From hydroxyethyl butylaniline, in the same manner and in a very good yield, the p-chlorethyl n-butylamino benzaldehyde is obtained as a weakly colored oil, which can be used without further purification.

*Example 2.*—At 70° C., 91 parts by weight of di-(hydroxyethyl)-aniline are gradually added to 169 parts by weight of phosphorus oxychloride, and the mixture is heated for some time at 90–100° C. After cooling at 10–15° C. a mixture of 135 parts by weight of N-methyl formanilide and 154 parts by weight of phosphorus oxychloride is gradually added, drop by drop, the solution is heated for some hours at 45–50° C. and poured on ice. The p-di-(chlorethyl)-aminobenzaldehyde is separated as a weakly colored oil, which hardens, after short stirring, to fine and practically pure crystals. The aldehyde crystallizes from alcohol in massive and long prisms of melting point 88.5° C. It corresponds to the following formula:

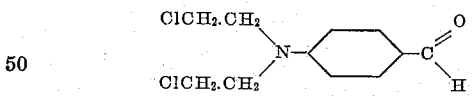

*Example 3.*—As described above, 42 parts by weight of phosphorus oxychloride are added to 53 parts by weight of N-hydroxyethyl diphenylamine at about 60° C.; the solution is heated at 90–100° C. for two hours and, after cooling, at about 20° C. a solution of 68 parts by weight of N-methyl formanilide and 77 parts by weight of phosphorus oxychloride in 100 parts by weight of benzene is added to the same. After heating for several hours at 45–50° C. and pouring on ice, the benzene layer is separated and washed several times with water containing hydrochloric acid and, after distilling off the benzene, the p-chlorethyl phenylaminobenzaldehyde is obtained as a weakly colored oil in a very good yield. It corresponds to the following formula:

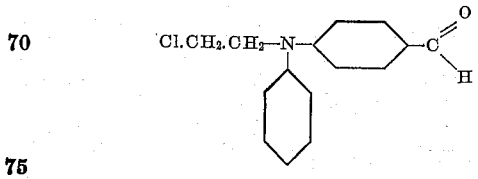

*Example 4.*—In a similar manner to that described above the p-(chlorethylbutyl)-amino-o-chlorobenzaldehyde is produced. At 50° C. 76 parts by weight of hydroxyethyl-n-butyl-m-chloraniline are added to 55 parts by weight of phosphorus oxychloride, and the solution is heated for 2 hours at 95–100° C. To the reaction mass a mixture of 90 parts by weight of methyl formanilide and 103 parts by weight of phosphorus oxychloride is then added, and the solution is heated for a few hours at 45–50° C. Then the reaction mass is poured on ice. The product, which is initially oily becomes crystalline after some time. The yield is very good. From alcohol the p-(chlorethylbutyl)-amino-o-chlorobenzaldehyde of melting point 51° C. is obtained in pure, white crystals. It corresponds to the following formula:

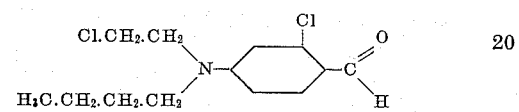

*Example 5.*—For the production of p-hydroxyethyl methylaminobenzaldehyde, to the p-chlorethyl methylaminobenzaldehyde three times the quantity of alcohol and seven times the quantity of a dilute aqueous sodium carbonate solution containing $1\tfrac{1}{10}$ equivalents of sodium carbonate are added, and the solution is refluxed, while stirring, until the sodium carbonate has been almost entirely consumed. Then the alcohol is distilled off, and the p-hydroxyethyl methylamino benzaldehyde is obtained as a weakly yellowish colored, gradually solidifying oil in good purity and yield. The product is extraordinarily easily soluble in organic agents, such as alcohols, ether, benzene and chloroform. It corresponds to the following formula:

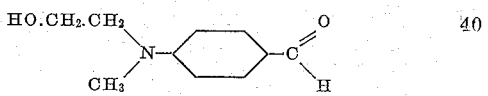

In order to avoid the addition of alcohol, the aldehyde containing halogen can also be treated with an aqueous sodium carbonate solution. In this case, however, the conversion proceeds more slowly on account of the insolubility of the aldehyde in water.

In the same manner, other hydroxyalkylaryl aminoaldehydes can be obtained from the respective halogen compounds.

*Example 6.*—p-Di-(chlorethyl)-aminobenzaldehyde is treated with about 15 times the quantity of alcohol of 50% strength and 1.05 mol of sodium carbonate, as described in Example 5. After distilling off the alcohol, the p-morpholine benzaldehyde is probably obtained as a weakly colored oil, which hardens to crystals in the cold. By recrystallizing from only a very small quantity of alcohol, the aldehyde is obtained in fine and colorless crystals of melting point 66–67° C. It is extraordinarily easily soluble in organic agents, such as alcohol, ethyl acetate, acetone and ether. It corresponds to the following formula:

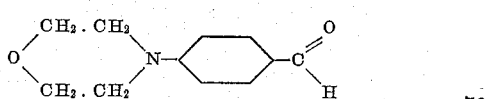

*Example 7.*—For the manufacture of the p-sulfoethyl methylamino benzaldehyde, unknown up to the present, one mol of the p-chlorethyl methylaminobenzaldehyde is heated for several hours in an autoclave at 180–200° C. with an about 10% aqueous solution of 1.05 mols of neutral sodium sulfite. Then the light yellow solution is salted out, whereby the p-sulfoethyl methylaminobenzaldehyde is obtained as sodium salt, in brilliant and weak yellow colored leaflets in very good yield. By recrystallizing from alcohol of about 90% strength, fine and colorless crystals are obtained. The aldehyde is very easily soluble in aqueous agents. It corresponds to the following formula:

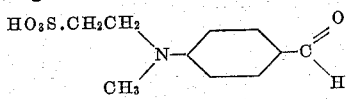

Example 8.—On treating, in the same manner, at 180–200° C., p-dichlorethylamino benzaldehyde with a solution of sulfite of about 30% strength containing 2 mols of sodium sulfite, from the weakly colored and clear solution, after distilling off the bulk of the water, the extraordinarily easily soluble disodium salt of the p-di-(sulfoethyl)-aminobenzaldehyde is obtained in nearly colorless crystals, which are obtained almost completely white after recrystallizing from alcohol of about 65% strength. The aldehyde is very easily soluble in aqueous agents. It corresponds to the following formula:

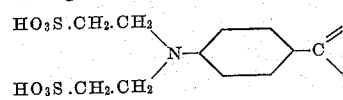

In the same manner other sulfoalkylaryl aminoaldehydes are obtained from the corresponding halogen derivatives.

The p-sulfoethyl benzylamino benzaldehyde, for instance, forms, as a sodium salt, fine and colorless crystals, which are very easily soluble in aqueous agents.

Example 9.—To a mixture of 135 parts by weight of methyl-formanilide and 154 parts by weight of phosphorus oxychloride there are added at 10–15° C. 109 parts by weight of di-(chloroethyl)-aniline. Then the mixture is heated for several hours at 45–50° C. and after this poured onto ice. The p-di-(chloroethyl)-aminobenzaldehyde formed in a good yield separates as an oil, which soon solidifies to a crystalline magma. The aldehyde obtained is identical with that obtained in accordance with Example 2.

Example 10.—To 80 parts by weight of phosphorus oxychloride there are slowly dropped at 20° C. 83 parts by weight of β-hydroxypropyl methylaniline, and after this the mixture is heated for several hours at 90–100° C. After cooling down to 20–25° C. there is dropped in a mixture of 135 parts by weight of methyl-formanilide and 154 parts by weight of phosphorus oxychloride; after this the mixture is heated for several hours at 40–50° C. and then poured onto ice. The p-(N-β-chloropropyl-methylamino)-benzaldehyde of the formula:

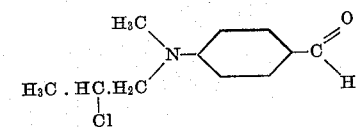

is obtained in form of a scarcely colored oil and can be used in further reactions without purification. The yield is a good one.

Example 11.—To 80 parts by weight of phosphorus oxychloride there are slowly dropped at 50° C. 90 parts by weight of hydroxyethyl m-ethyl-toluidine. The mixture obtained is heated for several hours at 90–100° C. After cooling down to 20–25° C. a mixture of 135 parts by weight of methylformanilide and 154 parts by weight of phosphorus oxychloride is dropped in. Then the whole is heated for several hours at 40–50° C. and after this poured onto ice. The p-chloroethyl-ethylamino-o-tolylaldehyde of the formula:

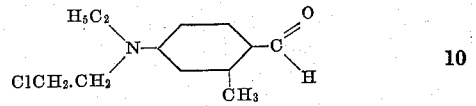

is obtained in form of an oil soon solidifying to a crystalline magma. From alcohol the aldehyde crystallizes in massive crystals of the melting point 54° C. The yield is a good one.

We claim:

1. The process which comprises reacting upon a compound selected from the group consisting of halogen alkyl arylamines and such derivatives thereof, in which the second hydrogen atom of the amino group is substituted by a member selected from the group consisting of alkyl, halogen-alkyl, hydroxy-alkyl, alkoxy-alkyl, sulfo-alkyl, aryl and the benzyl radicle, with an N-phenyl tertiary formamide and a compound of the group consisting of halogenides of phosphorus and sulfur and the oxygen compounds of the same by gradually adding the halogen alkyl arylamines to the other reaction components, acting upon the reaction product with water and substituting the halogen atom in the halogen-alkyl group of the halogen-alkyl amino-aryl-aldehydes by a member selected from the group consisting of hydroxyl, alkoxy and the sulfonic acid group.

2. The process which comprises reacting upon a compound selected from the group consisting of N-chloroalkyl aniline and such derivatives thereof in which the second hydrogen atom is substituted by a substituent selected from the group consisting of alkyl, halogen-alkyl, hydroxy-alkyl, alkoxy-alkyl, sulfo-alkyl, aryl, and the benzyl radicle with an N-phenyl tertiary formamide and with phosphorus oxychloride by gradually adding the N-chloroalkyl-aniline to the other reaction components, acting upon the reaction product formed with water, and substituting the chlorine atom in the chloroalkyl group of the chloroalkyl-aminoaryl aldehyde by a member selected from the group consisting of hydroxyl, alkoxy and the sulfonic acid group.

3. Compounds selected from the group consisting of aldehydes of the following general formula:

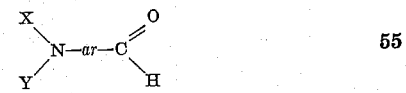

in which X stands for a member selected from the group consisting of halogenalkyl, hydroxyalkyl, alkoxyalkyl and sulfoalkyl, Y stands for a member selected from the group consisting of hydrogen, alkyl, halogenalkyl, hydroxyalkyl, alkoxyalkyl, sulfoalkyl, aryl and the benzyl radicle, and ar stands for an aromatic radical bearing an aldehyde group in para-position to the nitrogen atom, and such derivatives thereof in which X and Y stand for methylene chains which are joined together by an oxygen atom.

4. Compounds selected from the group consisting of aldehydes of the following formula:

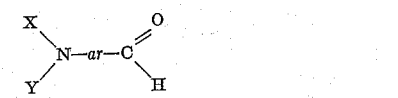

in which X stands for a member selected from the group consisting of halogenalkyl, hydroxyalkyl, alkoxyalkyl and sulfoalkyl, and Y stands for a member selected from the group consisting of hydrogen, alkyl, halogenalkyl, hydroxyalkyl, alkoxyalkyl, sulfoalkyl, aryl and the benzyl radicle, and *ar* stands for a radical of the benzene series bearing the aldehyde group in para-position to the nitrogen atom, and such derivatives thereof in which X and Y stand for methylene chains which are joined together by an oxygen atom.

5. Aldehydes of the following formula:

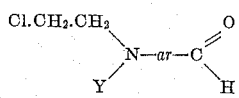

in which Y stands for a member selected from the group consisting of hydrogen, alkyl, halogenalkyl, hydroxyalkyl, alkoxyalkyl, sulfoalkyl, aryl and the benzyl radicle, *ar* stands for a radicle of the benzene series and the grouping

stands in para position to the nitrogen atom, being in general crystalline colorless substances, insoluble in water, soluble in organic solvents, and being valuable intermediates for the manufacture of dyestuffs.

6. Aldehydes of the following general formula:

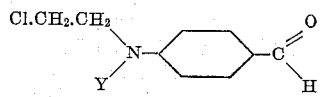

in which Y stands for an alkyl having from one to four carbon atoms, being in general crystalline colorless substances, insoluble in water, soluble in organic solvents, and being valuable intermediates for the manufacture of dyestuffs.

7. The aldehyde of the following formula:

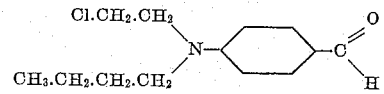

being a colorless oil, insoluble in water, soluble in organic solvents, and being a valuable intermediate for the manufacture of dyestuffs.

WERNER MÜLLER.
CARL BERRES.